G. C. HUNTER.
MAUSOLEUM.
APPLICATION FILED JUNE 18, 1910.
1,034,455.
Patented Aug. 6, 1912.
4 SHEETS—SHEET 1.
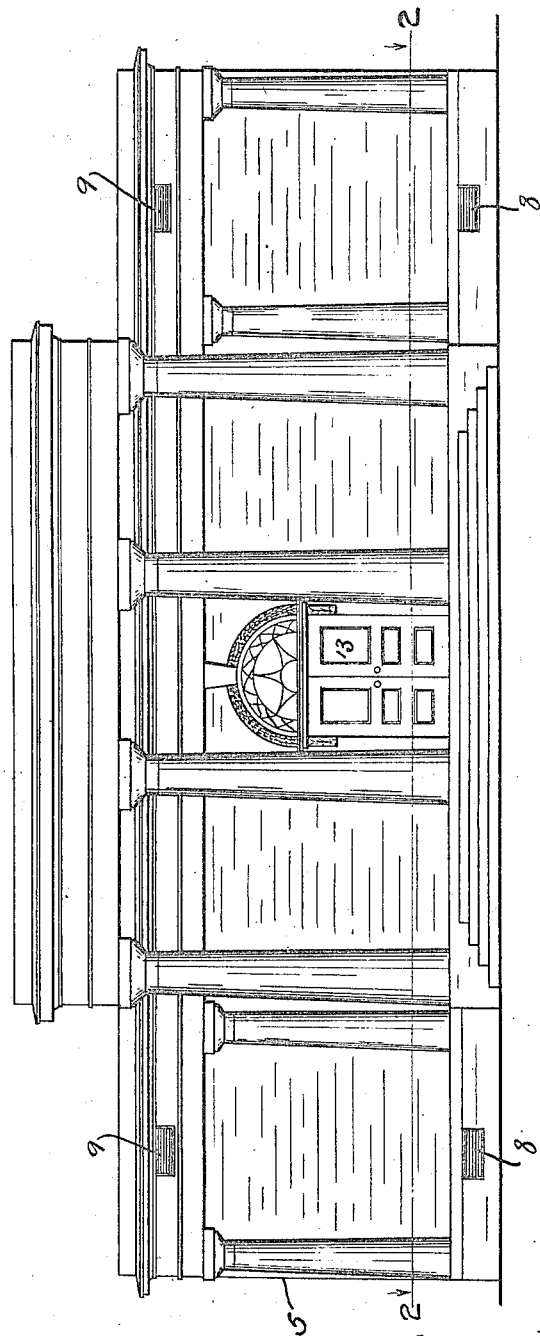

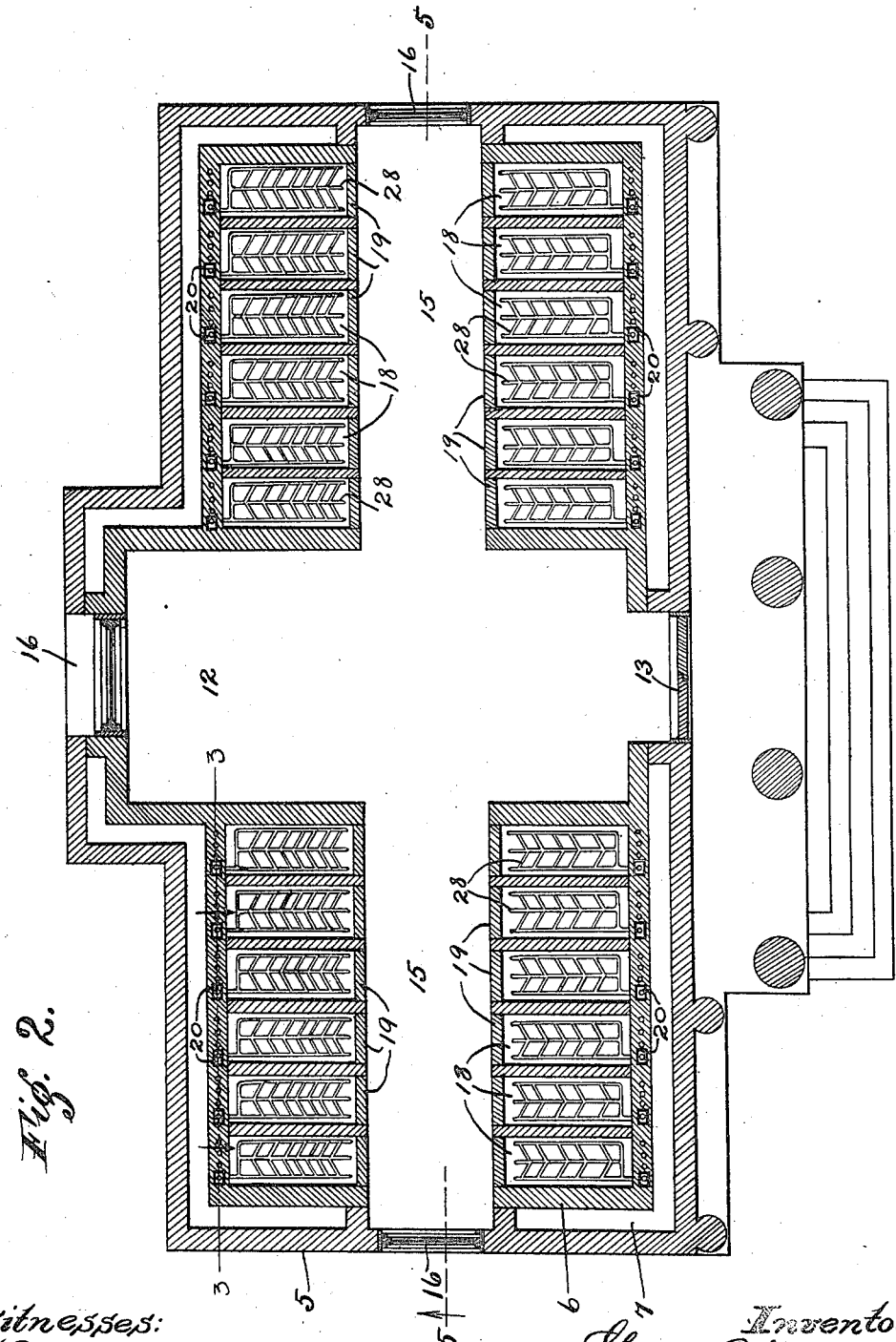

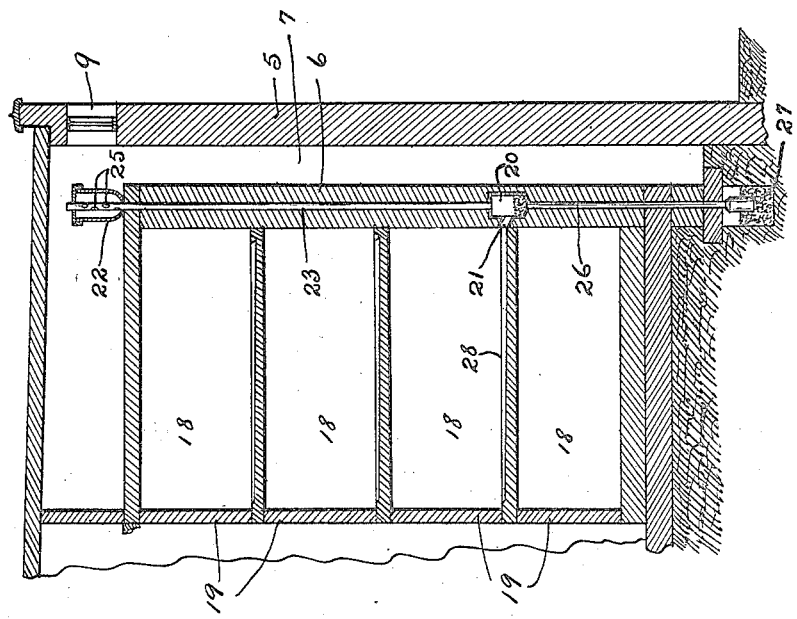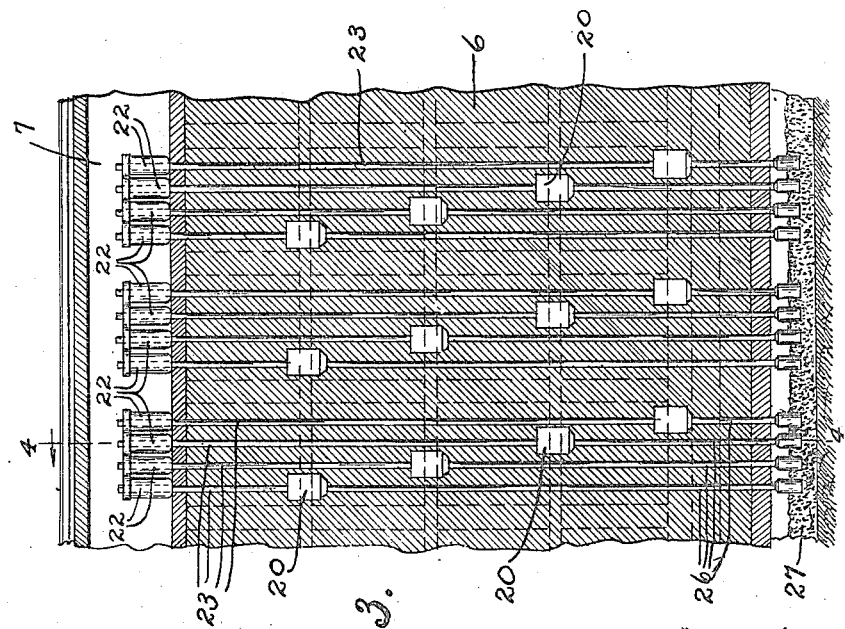

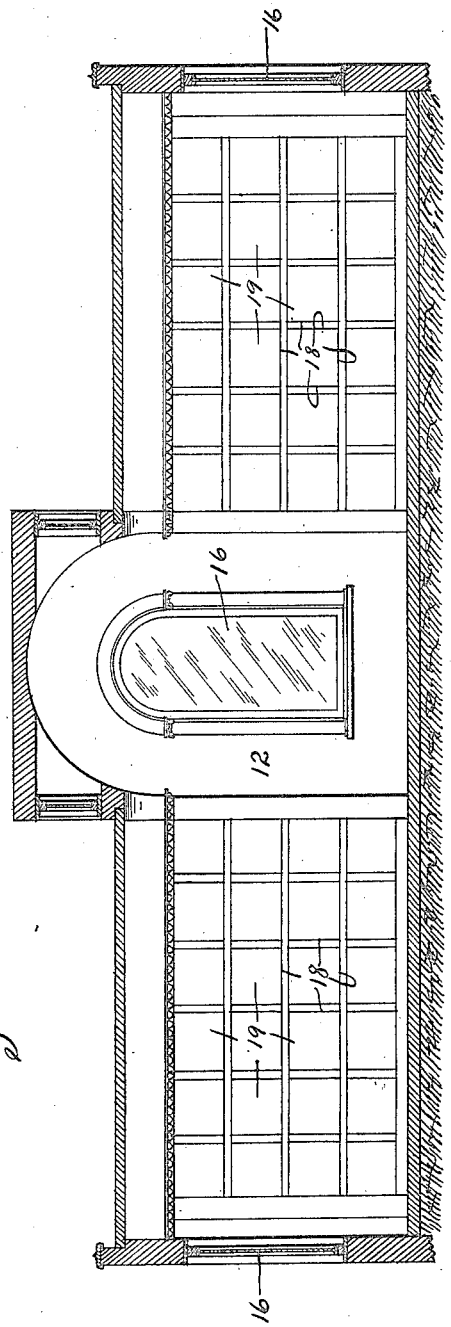

UNITED STATES PATENT OFFICE.

GROVER C. HUNTER, OF SHELBY, OHIO.

MAUSOLEUM.

1,034,455.

Specification of Letters Patent. Patented Aug. 6, 1912.

Application filed June 18, 1910. Serial No. 567,561.

*To all whom it may concern:*

Be it known that I, GROVER C. HUNTER, a citizen of the United States of America, residing at Shelby in the county of Richland and State of Ohio, have invented certain new and useful Improvements in Mausoleums; and I hereby declare the following to be a full, clear, and exact description of the invention, such as will enable others skilled in the art to which it pertains to make and use the same.

This invention relates to improvements in burial vaults or mausoleums.

All mausoleums heretofore constructed have defects, the greatest of which is allowing gases and fumes incident to putrefaction of animal matter to pass into the atmosphere without first having been thoroughly disinfected and purified. It is a known fact that the presence of bacteria and disease germs in these gases is a source of considerable danger to the community wherein such structures are erected and these dangers are further aggravated when the bodies of those who have died of contagious diseases are entombed therein.

One object of this invention is to provide a structure of this character which will be durable and permanent in construction, sanitary in its operation and which can be maintained with a minimum outlay of money and labor.

A further object of my invention is to provide an arrangement whereby the wall of the structure will be kept free from moisture thereby eliminating all danger from the action of frost in winter and adding greatly to the durability of the structure.

A further object of my invention is to provide accommodations within the structure for the holding of funeral service thereby protecting the funeral party from such risks as are attendant upon an outdoor funeral during inclement weather.

My invention therefore consists in providing a mausoleum having double walls with an air space between and openings near the top and bottom of the outer wall to permit of the free circulation of air between the two walls, thereby preventing moisture from accumulating on the walls.

My invention further consists in providing in a mausoleum means for purifying the gases and fluids from the bodies contained therein. This is accomplished by passing all gases and fluids through a solution of disinfectant before permitting them to escape to the outer air as will be set forth in the following specification.

My invention also consists in providing a mausoleum having a large number of crypts for the reception of bodies and having a lobby or chapel in which funeral services can be held.

My invention, therefore, consists in the features of construction and combination of parts described in the specification, pointed out in the claims and illustrated in the accompanying drawings.

Referring to the accompanying drawings Figure 1 is a front elevation of a mausoleum constructed in accordance with my invention. Fig. 2 is a horizontal section on line 2—2, Fig. 1, looking in the direction indicated by the arrow. Fig. 3 is a section on line 3—3, Fig. 2, looking in the direction indicated by the arrow. Fig. 4 is a section on line 4—4, Fig. 3, looking in the direction indicated by the arrow. Fig. 5 is a vertical section on line 5—5, Fig. 2.

The general structure of the mausoleum embodying my invention consists of an outer wall 5 and an inner wall 6, having an air space 7 therebetween. Openings 8 are provided in the outer wall 5 near the bottom thereof to admit air to the said air space 7 and the air is free to circulate all around the inner wall and pass out through openings 9 in the outer wall adjacent the top thereof, removing all moisture which might accumulate in the said air space and keeping the walls perfectly dry and wholesome. The structure is provided interiorly with a lobby or chapel 12 in which funeral services can be held. A door 13 is provided through which admittance is gained to said chapel. At each side of the chapel 12 are arranged corridors 15. On each side of the corridors 15 are provided catacombs or crypts 18 arranged tier upon tier, any suitable number of which may be provided. At the ends of the corridors and chapel are provided windows 16 which admit light to the interior of the structure. Disinfectant chambers 20 are provided in the wall 6, one at the rear end of each crypt. The bottom of these chambers 20 are located below the floor level of the crypts and the said crypts communicate with the said chambers 20 through downwardly inclined passageways 21. The disinfectant chambers 20 are suppied with disinfectant solution from a series of receptacles 22 placed above the uppermost series of crypts, each of the said chambers 20 being supplied from one of the said receptacles 22 by an independent pipe 23, which passes through the receptacle 22 and extends above the top of the receptacle, so that the supply pipe also serves as a vent pipe to convey away all gases as will be explained hereafter. The pipes 23 where they pass through the receptacles 22 are provided with apertures 25 through which the disinfecting fluid enters and flows down the said pipes to the disinfectant chambers. The disinfectant chambers 20 are partly filled with oakum or other suitable material for the purpose of retarding the flow of the disinfectant fluid through the receptacles. A drain pipe 26 is connected to the bottom of each chamber 20, said pipe extending down through the wall 6 and into a bed of sand or charcoal or other suitable material which acts as a further disinfectant. The bottom of the crypts are preferably grooved, as shown at 28, to form drainage channels for directing the fluids to the passageway 21.

When the structure is in use and a body is placed in the crypt, the front of the crypt is sealed by a slab 19 so that the crypt is entirely sealed except at the small passageway 21 at the rear of the crypt. Any fluids or gases resulting from the presence of the body in the crypt pass out through the said passageway 21 and into the disinfectant chamber 20. The fluid soaks through the oakum in the chamber 20 and then passes down through the drain pipe 26 into the sand or charcoal 27 which further disinfects the fluid leaving it free from all impurities. The gas will pass from the chamber 20 up through the pipe 23 and the disinfectant fluid flowing down through the said pipe will free the gas from all organic matter and other impurities. The gas will then escape to the open air through the openings 9 in the wall 6 at a point high above the ground.

What I claim is,—

1. In a mausoleum, a structure, a crypt formed in said structure, the wall of said structure forming the rear wall of the crypt, a chamber formed in the rear wall of the crypt, a passageway for the drainage of fluids from said crypt extending from the bottom of said crypt to said chamber and means for supplying a disinfectant to said chamber.

2. In a mausoleum, a structure, a crypt formed in the said structure, the wall of said structure forming the rear wall of the crypt, a chamber formed in the rear wall of the crypt, and extending below the level of the bottom of said crypt, a passageway for the drainage of fluids from said crypt extending from the bottom of said crypt to said chamber, a drainage pipe communicating with the lower part of said chamber, a vent pipe communicating with the upper of said chamber and means for supplying a disinfectant fluid to said chamber through the said vent pipe.

3. In a mausoleum, a structure, a series of crypts arranged around the wall of the structure, each crypt having an opening for receiving a casket, means for closing said opening, a series of chambers formed in the wall of the structure, drain-passageways extending from the bottoms of said crypts to said chambers, a series of drainage pipes communicating with the lower portions of said chambers, a series of vent pipes communicating with the upper portions of said chambers and means for supplying a disinfectant fluid to said chambers through said vent pipes.

4. In a mausoleum, a structure, a series of crypts arranged around the wall of said structure, each crypt having an opening for receiving a casket, means for closing said opening, a series of chambers formed in the wall of the structure, drain-passageways extending from the bottoms of said crypts to said chambers, a series of drainage pipes communicating with the upper portions of said chambers, means for supplying a disinfectant fluid to said chambers through said vent pipes and means arranged in said chambers for retarding the flow of the disinfectant fluid therethrough.

5. In a mausoleum, a structure, a crypt formed in the structure, the wall of said structure forming the rear wall of the crypt, a chamber formed in the rear wall of the crypt and extending below the level of the bottom wall of said crypt, a drainage passageway extending from said crypt to said chamber, a drainage pipe communicating with the lower part of said chamber, a vent pipe communicating with the upper part of said chamber, means for supplying disinfectant fluid to said chamber and means for retarding the passage of said fluid.

6. In a mausoleum, a structure having a series of crypts arranged within the said structure around the walls thereof, the wall of said structure forming the rear walls of said crypts, a series of chambers formed in the wall of the structure, drain-passageways extending from the bottom of said crypts to said chambers, a series of drainage pipes communicating with the lower portions of said chambers, a series of vent pipes communicating with the upper portions of said chambers and means for supplying a disinfectant fluid to said chambers.

In testimony whereof, I sign the foregoing specification, in the presence of two witnesses.

GROVER C. HUNTER.

Witnesses:
 VICTOR C. LYNCH,
 N. L. McDONNELL.

Copies of this patent may be obtained for five cents each, by addressing the "Commissioner of Patents, Washington, D. C."